(12) United States Patent
Hikata et al.

(10) Patent No.: US 6,410,633 B1
(45) Date of Patent: Jun. 25, 2002

(54) ANTIBACTERIAL GLASS AND RESIN COMPOSITE COMPRISING THE SAME

(75) Inventors: Hajime Hikata; Kazuyoshi Shindo; Toshio Yamanaka, all of Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/497,451

(22) Filed: Feb. 3, 2000

(51) Int. Cl.[7] .................................................. C08K 3/38
(52) U.S. Cl. ........................... 524/405; 501/21; 501/26; 501/67
(58) Field of Search ............................ 524/405; 501/21, 501/26, 67

(56) References Cited

U.S. PATENT DOCUMENTS

| | | | | | |
|---|---|---|---|---|---|
| 4,215,033 A | * | 7/1980 | Bowen | ...................... | 260/42.15 |
| 4,335,216 A | * | 6/1982 | Hodgkins | ...................... | 501/32 |
| 5,216,207 A | * | 6/1993 | Pradhu | ...................... | 174/256 |
| 5,306,674 A | * | 4/1994 | Ruderer | ...................... | 501/70 |
| 5,849,649 A | * | 12/1998 | Poole | ...................... | 501/26 |
| 6,187,701 B1 | * | 2/2001 | Sekino | ...................... | 501/67 |

FOREIGN PATENT DOCUMENTS

JP  H07-257938  10/1995

* cited by examiner

*Primary Examiner*—Paul R. Michl
(74) *Attorney, Agent, or Firm*—Collard & Roe, P.C.

(57) ABSTRACT

An antibacterial glass is a $ZnO$—$B_2O_3$—$SiO_2$ glass and includes 0–6 wt % $Na_2O$. Typically, the antibacterial glass is used as an antibacterial agent which is filled into a resin.

12 Claims, No Drawings

ANTIBACTERIAL GLASS AND RESIN COMPOSITE COMPRISING THE SAME

BACKGROUND OF THE INVENTION

This invention relates to an antibacterial glass for use as a resin-filling antibacterial agent and to a resin composite comprising a resin and the antibacterial glass.

A resin product such as a toothbrush, a soap case, a washbowl, a washstand, or a bathtub is used under a high-humidity condition and therefore suffers easy growth of bacteria and mold. In order to suppress the growth of bacteria and mold, use has been made of an antibacterial agent which is mixed with a resin. Generally, the antibacterial agent utilizes silver oxide which has an excellent antibacterial function. For example, zeolite powder containing silver ions in the crystal structure and soluble glass powder containing AgO as a glass composition are known as the antibacterial agent. However, silver oxide is expensive and the amount to be used is sometimes restricted due to economical reasons. On the other hand, the soluble glass powder containing AgO tends to be discolored under the effect of ultraviolet rays and heat during long-time use and is therefore unfavorable. Such discoloration is particularly undesirable if the resin product has a white color.

In view of the above, it is proposed to use a ZnO-based glass as the antibacterial agent. The ZnO-based glass is inexpensive and is never discolored under the effect of ultraviolet rays and heat. For example, Japanese Unexamined Patent Publication (JP-A) No. H07-257938 (257938/1995) discloses antibacterial glass powder comprising a $ZnO$—$B_2O_3$—$Na_2O$ glass.

However, if a resin product comprises a resin filled with the above-mentioned glass powder containing ZnO, several problems in appearance will arise during use of the resin product. Specifically, with lapse of time, the resin product loses the brightness to become dull in appearance. In addition, a rough touch is produced on the surface of the resin product.

SUMMARY OF THE INVENTION

It is an object of this invention to provide an antibacterial glass which contains ZnO but will not adversely affect the appearance of a resin product comprising a resin and the antibacterial glass mixed therewith.

It is another object of this invention to provide a resin composite including the above-mentioned antibacterial glass.

According to this invention, there is provided an antibacterial glass which is a $ZnO$—$B_2O_3$—$SiO_2$ glass and which includes 0–6 wt % $Na_2O$.

According to this invention, there is also provided a resin composite comprising a resin and an antibacterial agent. The antibacterial agent comprises an antibacterial glass which is a $ZnO$—$B_2O_3$—$SiO_2$ glass and which contains 0–6 wt % $Na_2O$.

DESCRIPTION OF PREFERRED EMBODIMENTS

An antibacterial glass according to this invention comprises a $ZnO$—$B_2O_3$—$SiO_2$ glass. This is because the $ZnO$—$B_2O_3$—$SiO_2$ glass has an appropriate solubility so that ZnO is released as $Zn^{2+}$ ions to provide an antibacterial function to a resin. Thus, ZnO is a primary factor providing the antibacterial function and is therefore an essential component. $B_2O_3$ and $SiO_2$ are glass-forming oxides which are essential to obtain the glass containing ZnO and having the appropriate solubility. It is important in this invention to restrict the content of a sodium component in the glass, i.e., to 6 wt % or less in terms of $Na_2O$. If the content of $Na_2O$ exceeds 6 wt %, the resin product loses its brightness during long-time use.

The antibacterial glass may have various composition ranges as far as the above-mentioned condition is satisfied. Preferably, the antibacterial glass consists essentially of, by weight percent, 55–65% ZnO, 18–30% $B_2O_3$, 8–20% $SiO_2$, 0–10% MgO, and 0–6% $Na_2O$.

The reason why the composition range is defined as mentioned above is as follows.

The content of ZnO is 55–65 wt %, preferably, 55–60 wt %. If the content of ZnO is less than 55 wt %, the antibacterial effect is decreased. On the other hand, if the content exceeds 60 wt %, vitrification is difficult.

The content of $B_2O_3$ is 18–30 wt %, preferably, 20–25 wt %. If the content of $B_2O_3$ is less than 20 wt %, vitrification tends to become difficult. If the content is less than 18 wt %, vitrification is difficult. On the other hand, if the content exceeds 25 wt %, the water-resistance of the glass tends to be degraded. If the content exceeds 30 wt %, the water-resistance is drastically degraded so that the release of $Zn^{2+}$ ions exceeds an appropriate level. As a result, the antibacterial function can not be maintained for a long period of time. This unfavorably shortens the life of the antibacterial glass.

$SiO_2$ is a glass-forming component. The content of $SiO_2$ is 8–20 wt %, preferably, 10–15 wt %. If the content of $SiO_2$ is less than 10 wt %, vitrification tends to become difficult. If the content is less than 8 wt %, vitrification is difficult. On the other hand, if the content exceeds 15 wt %, the release of $Zn^{2+}$ ions from the glass tends to be decreased. If the content exceeds 20 wt %, the release of $Zn^{2+}$ ions from the glass is considerably decreased so that the antibacterial function is insufficient.

MgO has an effect of lowering the viscosity of the glass and acts like a flux which promotes the melting of the glass. The content of MgO is 0–10 wt %, preferably, 3–7 wt %. MgO need not essentially be contained but is preferably contained in an amount of 3 wt % or more in order to assure stable melting of the glass. However, if the content exceeds 7 wt %, the appearance of the resin product tends to be affected. If the content exceeds 10 wt %, the resin product will lose its brightness during long-time use $Na_2O$ can be added up to 6 wt %, preferably, up to 4 wt %, more preferably, up to 0.5 wt % or less in order to improve the meltability of the glass. However, since the influence upon the appearance of the resin product is great as mentioned above, it is desired not to contain $Na_2O$.

Furthermore, other components may be added as far as the characteristics of the glass such as the chemical durability, the solubility, and the antibacterial function are not adversely affected. For example, CaO, SrO, BaO, $Li_2O$, $K_2O$, $Al_2O_3$, $TiO_2$, and $ZrO_2$ can be added.

The antibacterial glass of this invention can be provided in various forms such as glass powder, glass fiber, and glass flakes. Among others, the glass powder achieves a good antibacterial function because a specific surface area is larger than fiber and flakes. The average particle size of the glass powder is between 1 and 20 μm, preferably, between 2 and 20 μm. Specifically, if the average particle size of the glass powder is smaller than 1 μm, it is difficult to mix the glass powder with the resin. If the average particle size is larger than 20 μm, the release of $Zn^{2+}$ ions per unit weight is unfavorably reduced.

The antibacterial glass of this invention can be used as an antibacterial agent to be filled into thermosetting resin or thermoplastic resin. For example, it is possible to use the antibacterial glass with phenol resin, polyester resin, melamine resin, urea resin, diallylphthalate resin, epoxy resin, silicone resin, vinyl chloride resin, vinyl acetate resin, polyethylene resin, polystyrene resin, polypropylene resin, acrylic resin, polyurethane resin, SAN (styrene acrylonitrile) resin, ABS (acrylonitrile butadiene styrene) resin, polycarbonate resin, fluororesin, polyimide resin, polyphenyl sulfide resin, and a composite thereof. Among others, use is preferably made of acrylic resin, polyester resin, melamine resin, and ABS resin typically used in sanitary containers and silicone resin typically used as a sealing material.

The antibacterial glass of this invention is not only applicable to the resin-filling antibacterial agent but also used in various antibacterial applications such as an antibacterial enamel to cover a glass or ceramics and an antibacterial paint to cover a metal.

A resin composite according to this invention contains the above-mentioned antibacterial glass. The content of the antibacterial glass is 0.1–70 vol %, preferably, 0.1–10 vol %. The reason why the content is restricted as mentioned above is as follows. If the content is less than 0.1 vol %, it is difficult to provide a sufficient antibacterial function to the resin product. On the other hand, the antibacterial effect is increased as the content of the antibacterial glass is greater. However, the antibacterial effect is no longer increased if the content exceeds 10 vol %. If the content exceeds 70 vol %, molding of the resin becomes difficult.

As the resin, use may be made of phenol resin, polyester resin, melamine resin, urea resin, diallylphthalate resin, epoxy resin, silicone resin, vinyl chloride resin, vinyl acetate resin, polyethylene resin, polystyrene resin, polypropylene resin, acrylic resin, polyurethane resin, SAN (styrene acrylonitrile) resin, ABS (acrylonitrile butadiene styrene) resin, polycarbonate resin, fluororesin, polyimide resin, polyphenyl sulfide resin, and a composite thereof. Among others, use is preferably made of acrylic resin, polyester resin, melamine resin, and ABS resin typically used in sanitary containers and silicone resin typically used as a sealing.

In the resin composite of this invention, various additives typically contained in the resin product or another antibacterial agent may be appropriately contained in addition to the antibacterial glass.

EXAMPLES

Hereinafter, this invention will be described more in detail in conjunction with several specific examples.

Table 1 shows examples (Samples Nos. 1–4) of this invention and a comparative example (Sample No. 5).

TABLE 1

| Sample No. | 1 | 2 | 3 | 4 | 5 |
|---|---|---|---|---|---|
| Glass Composition | | | | | |
| ZnO | 55.1 | 59.0 | 59.0 | 59.0 | 33.7 |
| $B_2O_3$ | 24.5 | 23.0 | 20.2 | 24.0 | 57.7 |
| $SiO_2$ | 14.5 | 13.0 | 14.3 | 12.0 | — |
| MgO | 5.9 | 5.0 | 6.5 | 4.7 | — |
| $Na_2O$ | — | — | — | 0.3 | 8.6 |
| Antibacterial Function | good | good | good | good | good |

TABLE 1-continued

| Sample No. | 1 | 2 | 3 | 4 | 5 |
|---|---|---|---|---|---|
| Appearance of Resin Plate | good | good | good | good | not good |

Each sample was prepared in the following manner.

At first, zinc oxide, boric acid, pure silica, magnesium oxide, and sodium carbonate were sufficiently mixed in a predetermined ratio and put in a platinum-rhodium alloy crucible to be melted at a temperature between 1300 and 1400° C. for four hours. A resultant melt was molded into a film-like cullet having a thickness of about 1 mm. The cullet was pulverized by a ball mill and made to pass through a 105 $\mu$m-mesh sieve to obtain glass powder having an average particle size between 7 and 8 $\mu$m. Herein, the average particle size was measured by an air-flow specific surface meter (manufactured by Shimadzu Corporation). Thus, each sample was obtained.

Then, polyester resin powder as the resin and the above-mentioned glass powder as the antibacterial glass were mixed in a volumetric ratio of 95: 5. The mixture (resin composite) was molded into resin plates of about 10 cm square as the resin product. Each of the resin plates was evaluated for the antibacterial function and the appearance. The results are shown in Table 1.

As seen from Table 1, each of the resin plates using Samples Nos. 1–4 as the examples of this invention exhibited a good antibacterial function. After an accelerated test, no deterioration in appearance was observed. On the other hand, the resin plate using Sample No. 5 as the comparative example exhibited a good antibacterial function but lost its brightness after the accelerated test. Thus, the deterioration in appearance was significant.

The antibacterial function was evaluated as follows. At first, preparation was made of a gelatin sheet including Escherichia coli as bacteria in a concentration of $2\times10^3/cm^2$. The gelatin sheet was attached onto the resin plate. Then, after cultivation at 35° C. for 100 hours, the number of living bacteria was counted. If the number of living bacteria was less than 10 and not less than 10, the antibacterial function was judged "good" and "not good", respectively. To evaluate the appearance of the resin plate, the accelerated test was performed in the following manner. Specifically, the resin plate was immersed in water and boiled for 500 hours. Thereafter, the surface of the resin plate was compared with that in an initial state before the test. If the brightness in the initial state was maintained and was lost with the surface turned dull, the appearance was judged "good" and "not good", respectively.

As described, the antibacterial glass of this invention does not adversely affect the appearance of the resin product if it is mixed with the resin molded into the resin product. In addition, the antibacterial glass of this invention provides the resin with a good antibacterial function. Therefore, the antibacterial glass of this invention is advantageously used as the antibacterial agent to be filled into the resin.

The resin composite of this invention has a good antibacterial function and is never deteriorated in appearance. Therefore, the resin composite of this invention is advantageously used for various resin products, such as a toothbrush, a soap case, a washbowl, a washstand, and a bathtub, required to have a cleanness and for a sealing material used in a humid environment such as a bathroom.

What is claimed is:

1. An antibacterial $ZnO-B_2O_3-SiO_2$ glass which includes 0–6 wt % $Na_2O$ and comprises 55–65 wt % ZnO.

2. An antibacterial glass as claimed in claim 1, wherein said antibacterial glass is used as an antibacterial agent which is filled into a resin.

3. An antibacterial glass as claimed in claim 2, wherein said resin is selected from the group consisting of a polyester resin, an acrylic resin, a melamine resin, an ABS (acrylonitrile butadiene styrene) resin, and a silicone resin.

4. An antibacterial glass as claimed in claim 1, wherein said antibacterial glass is of glass powder.

5. An antibacterial glass as claimed in claim 4, wherein said glass powder has an average particle size between 1 and 20 μm, both inclusive.

6. An antibacterial glass as claimed in claim 1, consisting essentially of, by weight percent, 55–65% ZnO, 18–30% $B_2O_3$, 8–20% $SiO_2$, 0–10% MgO, and 0–6% $Na_2O$.

7. A resin composite comprising a resin and an antibacterial agent, wherein said antibacterial agent comprises an antibacterial $ZnO-B_2O_3-SiO_2$ glass which includes 0–6 wt % $Na_2O$ and comprises 55–65 wt % ZnO.

8. A resin composite as claimed in claim 7, wherein the content of said antibacterial glass in said resin composite is between 0.1 and 70 vol %, both inclusive.

9. A resin composite as claimed in claim 7, wherein said resin is selected from the group consisting of a polyester resin, an acrylic resin, a melamine resin, an ABS (acrylonitrile butadiene styrene) resin, and a silicone resin.

10. A resin composite as claimed in claim 7, wherein said antibacterial glass is of glass powder.

11. A resin composite as claimed in claim 10, wherein said glass powder has an average particle size between 1 and 20 μm, both inclusive.

12. A resin composite as claimed in claim 7, wherein said antibacterial glass consists essentially of, by weight percent, 55–65% ZnO, 18–30% $B_2O_3$, 8–20% $SiO_2$, 0–10% MgO, and 0–6% $Na_2O$.

* * * * *